June 24, 1930.   J. L. KELLY   1,767,682
VULCANIZING APPARATUS
Filed June 26, 1928   2 Sheets-Sheet 1

Inventor
John L. Kelly
By Lyon & Lyon
Attorneys

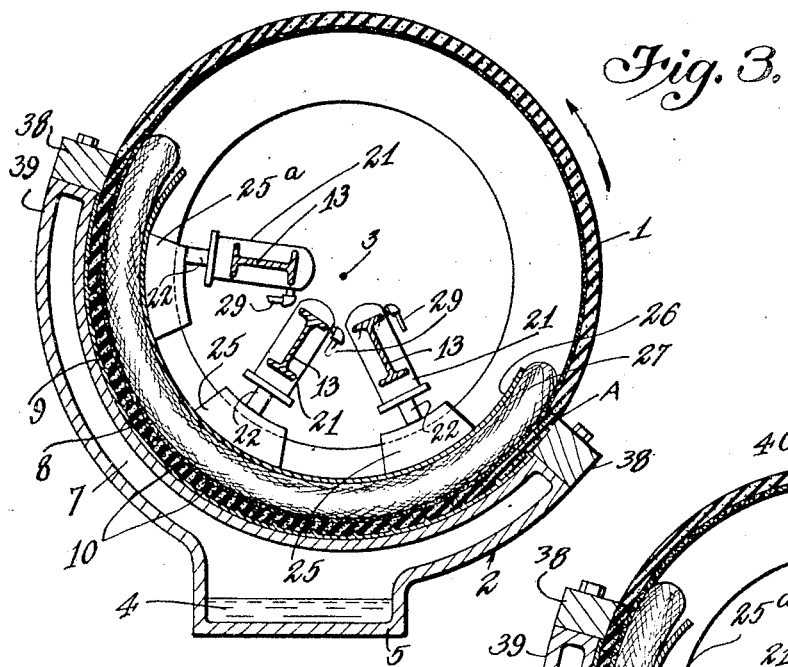
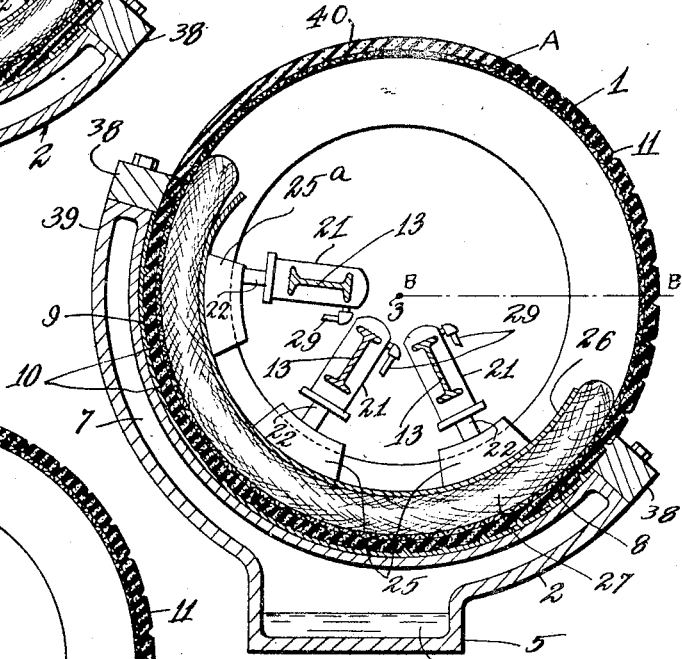
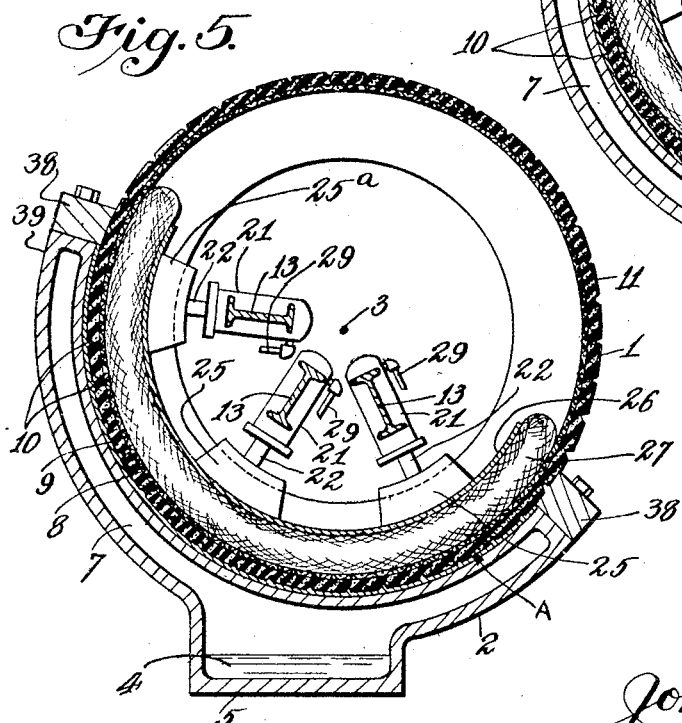

Patented June 24, 1930

1,767,682

UNITED STATES PATENT OFFICE

JOHN L. KELLY, OF LOS ANGELES, CALIFORNIA

VULCANIZING APPARATUS

Application filed June 26, 1928. Serial No. 288,369.

This invention relates to vulcanizing apparatus of the type employed for vulcanizing tires. In the present specification an embodiment of the invention is disclosed which particularly adapts it for use as a tire vulcanizer, although features of the invention are evidently applicable to vulcanizers for different specific purposes.

In molds of this type the tire is held in a U-shaped vulcanizing socket and pressure is exerted against the inner face of the tire to press it against the mold forcibly while it is being vulcanized. In operating such a mold there is a tendency to overcure the gum and produce a bulge in the tire at the upper edge of the mold. The general object of this invention is to overcome this difficulty and to provide improved means for exerting the pressure upon the inner face of the tire, and also to construct the same so that pressure can be developed at any number of points desired and properly distributed along the inner face of the tire.

A further object of the invention is to construct the apparatus so that fluid or liquid pressure can be utilized to exert the pressure upon the tire and to construct it so as to facilitate the conducting of the operating fluid to the presses that are employed, and return the same to a reservoir.

A further object of the invention is to provide a vulcanizing mold in which the tire being vulcanized can be so manipulated as to prevent any possibility of overcuring the tire at any point.

A further object of the invention is to construct the apparatus so that in spite of the use of pipe connections to conduct the fluid under pressure to the presses, the mold will be readily accessible.

Further objects of the invention will appear hereinafter.

The invention consists in the novel parts and combination of parts to be described hereinafter, all of which contribute to produce an efficient vulcanizing apparatus.

A preferred embodiment of the invention is described in the following specifications, while the broad scope of the invention is pointed out in the appended claims.

In the drawings:

Figure 3 is a vertical section taken about on the line 3—3 of Figure 2, but upon a reduced scale with respect to Figure 2, and indicating a tire in position in the mold during the first stage of the vulcanizing operation.

Figure 4 is a view similar to Figure 3, but showing the tire in the second stage of the vulcanizing operation.

Figure 5 is a view similar to Figures 3 and 4, but showing the third and last stage of the vulcanizing operation.

Figure 1:
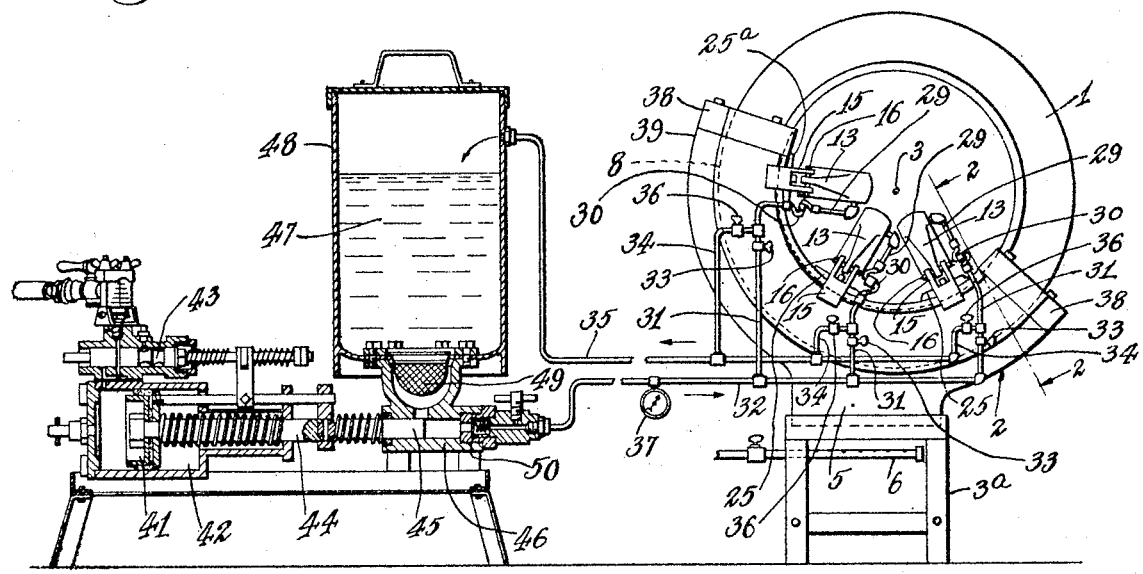
Figure 1 is a side elevation of my apparatus with the pipe connections broken away, and also illustrating the pressure developing apparatus in connection with which my apparatus is preferably employed.
Figure 2:
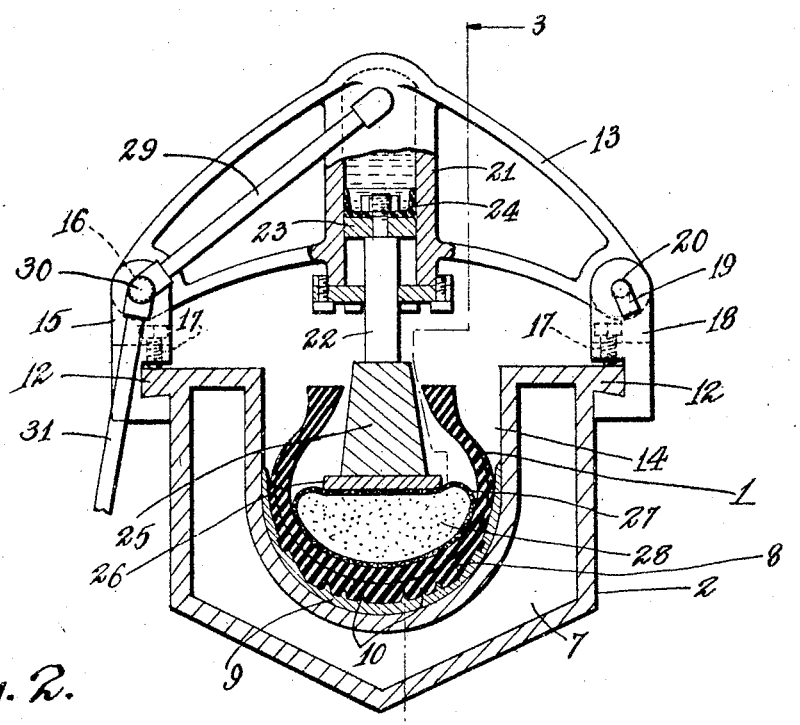
Figure 2 is a cross-section on the line 2—2 of Figure 1 upon an enlarged scale, the wall of the pressure cylinder being broken away, and parts omitted.

Referring more particularly to the parts and particularly to Figure 1, 1 represents a tire mounted in the vulcanizing mold 2. This mold is constructed so that it extends longitudinally along the tire and is preferably of the usual arcuate form; that is to say, the longitudinal axis of the mold is on the arc of a circumference having its axis at 3, which is the center or axis of the tire.

The mold 2 is supported on a suitable frame 3ª so that the water 4 in the basin 5 of the device may be heated in any suitable manner, for example, by a gas burner 6. The mold 2 is made hollow so that it has a heating chamber 7 into which the steam extends to heat the vulcanizing face 8 of the tire. This vulcanizing face 8 is provided with a liner 9 which carries projections 10 upon it to form an indented face on the tread 11 of the tire and give the tread any of the well-known characteristic distinctive designs.

The sides of the mold 2 are provided with guiding means in the form of a lateral projecting flange 12 at each side. Mounted on these flanges I provide a plurality of bridge bars 13 which extend across a U-shaped pocket 14 which forms the chamber of the mold to receive the tire. These bridge bars are mounted on a joint connection at one side and a detachable connection at the other side so that they can be swung out of the way to give access to the interior of the mold. In order to accomplish this I provide a clamp 15 at one side of the mold corresponding to each bridge bar and connected to it by a pivot pin located at the point 16.

The clamp 15 is held in place by clamping bolt 17.

At the other side of the mold a similar clamp 18 is provided which carries a removable pin 19 that is received in aligning openings 20 formed in the clamp and the end of the bridge bar. The bridge bar is constructed and anchored to the mold in such a way as to enable it to resist the force developed by the press which it carries. In the present instance the press is in the form of a fluid or hydraulic cylinder 21 having a ram 22 which extends radially outward from the axial point 3 so that the ram will move toward or into the mold. The ram constitutes the plunger or piston rod of a piston 23 carrying a cup leather 24.

Corresponding to each ram 22 I provide a block 25 which may be formed of iron and of enlarged dimensions at its base. These blocks impart the pressure of the ram to a distributor in the form of a steel plate or strip 26 which extends around within the tire. However, this strip does not exert its pressure directly against the tire, but exerts it upon a cushion 27 in the form of an elongated bag or sack filled with a finely divided substance such as sand 28. An ordinary sand bag serves well for this purpose.

Flexible means is provided for conducting fluid or liquid under pressure to the presses 21. In order to avoid the necessity for employing hose for this purpose, I provide each press with a rigidly attached inlet pipe 29 the outer end of which is located at the point 16 and at this point I provide a universal joint 30 located substantially on the axis of the pivot of the bridge bar at this point. This universal joint connection may be of any desired construction enabling the fluid to be carried from a fixed pipe connection 31, through the joint and into the inlet pipe 29.

In the present instance I have illustrated three of these presses 21 carried on three bridge bars. There is one of the connections 31 corresponding to each bridge bar, and these connections extend downwardly so as to connect with a main 32 which brings the operating fluid to the presses from a common source of pressure to be described hereinafter. Each of these pipe connections 31 may be shaped to accommodate it to the particular press with which it connects. Each of these connections has a vertical extension leading up from the main pipe 32, and each of these vertical connections is provided with a valve 33 enabling the flow through the connection to be shut off. Above each of the valves 33 a return pipe 34 is connected leading to a main return pipe 35, and these return connections are all provided with valves 36, respectively. The main 32 may be provided with a pressure gauge 37.

At each end of the mold 2 I provide a mold block 38 formed of non-conducting material such as wood. The inner ends of these blocks preferably project slightly beyond the heating face 8 of the mold if desired, so as to provide abutments to receive the ends of the mold strip or matrix 9 and hold the same in place.

In the use of such a mold, the end 39 of the mold, which is elevated, tends to become somewhat hotter than the remainder of the mold, and care must be taken in the operation of such a mold to prevent overcuring of the gum in the vicinity of this point, and bulging of the gum above the edge of block 38. My apparatus is intended particularly to overcome this difficulty. For this reason I do not attach the blocks 25 to the rams 22, but prefer to have them unattached so as to permit the block 25ª which is employed near the point 39 to be used in the first two stages of the vulcanizing operation, in the position in which it is shown in Figures 3 and 4, that is to say, it is held in a depressed position so that it exerts its pressure below the axis of the ram 22. In the last stage, as illustrated in Figure 5, this block may be held in an elevated position so as to have its middle axis coincide substantially with the axis of the ram.

Figure 3 represents the first stage of the vulcanizing operation. After the completion of the vulcanizing of the portion of the tire within the mold, as indicated in Figure 3, the tire is then slightly withdrawn from the mold and rotated on its own axis in the direction indicated by the arrow in Figure 3, so that the point A of the tire will be moved around to the point A indicated in Figure 4. The tire is then reset in the mold, with the indentations already molded registering with the projections 10 at the right end portion of the mold. The presses and blocks are then set in position for operation as indicated in Figure 4, and the pressure is again applied to the tire to press it against the molding face. After completion of the vulcanizing of the rubber in the position shown in Figure 4, the tire is then removed from the mold and rotated on the diametrical axis that coincides with the line B—B of Figure 4. This will bring the point A of the tire to the point indicated in Figure 5 and will bring all of the unvulcanized tread located at 40 in Figure 4 within the mold.

Any suitable means may be employed for developing pressure in the fluid or liquid employed in my vulcanizing apparatus. I prefer, however, to employ the common type of apparatus illustrated in Figure 1. This apparatus includes a piston 41 moving in a cylinder 42 and operated by compressed air controlled through a valve 43. The piston rod 44 from this piston operates a plunger 45 reciprocating in a barrel 46 which receives the operating fluid such as oil 47 from a reservoir 48. This liquid passes down through a strainer 49. At each forward stroke of the plunger 45 the liquid is forced out of the barrel through a check-valve 50 and into the main 32 already described.

The return pipe 35 referred to above leads the liquid back from the vulcanizer into the upper part of the reservoir.

It will be evident that by controlling the operation of the compressing apparatus and observing the gauge 37, the pressure employed can be nicely controlled.

By shifting the block 25ᵃ down as indicated in Figures 3 and 4 the point of application of pressure is brought down somewhat below the point 39 so that the danger of bulging the gum at this point is avoided. In Figure 3 the position of the projecting end of the strip 26 indicates how the pressure is relieved here.

This apparatus is particularly useful for vulcanizing "retread" tires.

It is understood that the embodiment of the invention described herein is only one of the many embodiments this invention may take, and I do not wish to be limited in the practice of the invention, nor in the claims, to the particular embodiment set forth.

What I claim is:

1. In apparatus for vulcanizing tires or the like, the combination of a mold having a vulcanizing face with means for heating the same, a fluid-operated press supported opposite the vulcanizing face having a ram moving toward the vulcanizing face, and movable means between the ram and the vulcanizing face for distributing the pressure of the ram on the tire.

2. In apparatus for vulcanizing tires or the like, the combination of a mold having a vulcanizing face to receive the tire with means for heating the same, a fluid-operated press supported opposite the said face having a ram moving toward the said face, and a yielding cushion between the ram and the tire operating to distribute the pressure of the tire against the heating face.

3. In apparatus for vulcanizing tires or the like, the combination of a mold having a vulcanizing face with means for heating the same, a plurality of fluid-operated presses supported opposite the vulcanizing face, each press having a ram moving toward the vulcanizing face, and a yielding cushion between the tire and the rams operating to distribute the pressure of the tire against the vulcanizing face.

4. In apparatus for vulcanizing tires or the like, the combination of a mold having a vulcanizing socket extending along the same, a plurality of fluid-operated presses mounted on the frame so as to be capable of movement for adjustment along the vulcanizing socket, a ram corresponding to each press, and means including a loose block for imparting pressure from the rams to the tire in the vulcanizing socket.

5. In apparatus for vulcanizing tires or the like, the combination of a mold having a vulcanizing socket extending along the same, a plurality of bridge-bars extending across the vulcanizing socket, means including a joint for connecting one end of each bridge-bar to the frame and disconnectible means at the other end of each bridge-bar for securing it to the frame, a fluid-operated press carried by each bridge-bar and having a ram movable thereby in the vulcanizing socket, and means for imparting pressure from the rams to a tire within the socket.

6. In apparatus for vulcanizing tires or the like, the combination of a mold having a vulcanizing socket extending along the same, a plurality of bridge-bars extending across the vulcanizing socket, means including a joint for connecting one end of each bridge-bar to the frame and disconnectible means at the other end of each bridge-bar for securing it to the frame, a fluid-operated press carried by each bridge-bar and having a ram movable thereby in the vulcanizing socket, means for imparting pressure from the rams to a tire within the socket, and flexible means for conducting fluid under pressure to the press.

7. In apparatus for vulcanizing tires or the like, the combination of a mold having a vulcanizing socket extending along the same, a plurality of bridge-bars extending across the vulcanizing socket, means including a joint for connecting one end of each bridge-bar to the frame and disconnectible means at the other end of each bridge-bar for securing it to the frame and enabling each bridge-bar when disconnected, to be swung to one side of the socket to facilitate access to the socket, a fluid-operated press carried by each bridge-bar and having a ram moving in the vulcanizing socket, and means for imparting pressure from the ram to a tire within the socket.

8. In apparatus for vulcanizing tires or the like, the combination of a mold having a vulcanizing socket with a guide extending along the frame on each side of the socket, a plurality of bridge-bars extending across the vulcanizing socket, a clamp corresponding to each bridge-bar movable along one of the guides and having a joint connection with the bridge-bar to permit the same to be swung up to give access to the vulcanizing socket, a second clamp corresponding to each bridge-bar movable along the guide on the other side of the socket with means for detachably securing the other end of the bridge-bar thereto, a fluid-operated press carried by each bridge-bar and having a ram moving in the vulcanizing socket, and means for imparting pressure from the rams to the tire within the socket.

9. In apparatus for vulcanizing tires or the like, the combination of a mold having a vulcanizing socket extending along the same, a plurality of bridge-bars extending across the vulcanizing socket, means including a pivot joint for connecting one end of each bridge-bar to the frame with disconnectible means at the other end of each bridge-bar for securing it to the mold, a fluid-operated press carried by each bridge-bar and having a ram moving in the vulcanizing socket, means for imparting pressure from the rams to a tire within the socket, and a pipe for conducting fluid under pressure to each press having a flexible joint located substantially on the axis of the pivot.

10. In apparatus for vulcanizing tires or the like, the combination of an arcuate mold having a vulcanizing socket extending along the same, a plurality of bridge-bars extending across the vulcanizing socket, a clamp corresponding to each end of each bridge-bar guided to move along the mold, a pivot connection between one of said clamps and one end of each bridge-bar and disconnectible means for connecting the other end of the bridge-bar to the opposite clamp, a fluid operated press carried by each bridge-bar and having a ram moving in the vulcanizing socket, means for imparting pressure from the rams to a tire within the socket, and flexible means for conducting the operating fluid under pressure to the presses.

11. In apparatus for vulcanizing tires or the like, the combination of an arcuate mold having a vulcanizing socket extending along the same, a plurality of bridge-bars extending across the vulcanizing socket, a clamp corresponding to each end of each bridge-bar guided to move along the mold, a pivot connection between one of said clamps and one end of each bridge-bar and disconnectible means for connecting the other end of the bridge-bar to the opposite clamp, a fluid operated press carried by each bridge-bar and having a ram moving in the vulcanizing socket, means for imparting pressure from the rams to a tire within the socket, a fixed pipe connection corresponding to each bridge-bar with a common source of pressure, and flexible means connecting each pipe connection to its corresponding press.

12. In apparatus for vulcanizing tires or the like, the combination of an arcuate mold having a vulcanizing socket extending along the same, a plurality of bridge-bars extending across the vulcanizing socket, a clamp corresponding to each end of each bridge-bar guided to move along the mold, a pivot connection between one of said clamps and one end of each bridge-bar and disconnectible means for connecting the other end of the bridge-bar to the opposite clamp, a liquid operated press carried by each bridge-bar and having a ram moving in the vulcanizing socket, means for imparting pressure from the rams to a tire within the socket, a fixed pipe connection corresponding to each bridge-bar with a common source of pressure, flexible means connecting each pipe connection to its corresponding press, a reservoir, and fixed return pipes connected to the said pipe connections for returning the operating liquid to the reservoir, with valves in the return pipes and in the said pipe connections.

13. In apparatus for vulcanizing tires or the like, the combination of an arcuate mold having a vulcanizing socket extending along the same, a block of non-conducting material located at each end of the arcuate mold, and projecting inwardly beyond the inner face of the vulcanizing socket, a matrix in the form of a liner for the said socket disposed on the face of the socket with its ends adjacent said blocks, a yielding cushion extending along the vulcanizing socket and adapted to rest upon the inner face of the tire, a plurality of hydraulic presses supported on said mold and having rams movable into the socket, and a block corresponding to each ram and capable of being shifted out of line with the axis of its corresponding ram for imparting pressure to said cushion.

14. In apparatus for vulcanizing tires or the like, the combination of an arcuate mold having a vulcanizing socket extending along the same, a block of non-conducting material located at each end of the arcuate mold and projecting inwardly beyond the inner face of the vulcanizing socket, a matrix in the form of a liner for the said socket disposed on the face of the socket with its ends adjacent said blocks, a yielding cushion extending along the vulcanizing socket and adapted to rest upon the inner face of the tire, a plurality of hydraulic presses supported on said mold and having rams movable into the socket, a block corresponding to each ram and capable of being shifted out of line with the axis of its corresponding ram for imparting pressure to said cushion, and a pressure equalizing plate located between the blocks and the cushion for distributing the pressure of the blocks against the cushion.

Signed at Los Angeles, California, this 14th day of June, 1928.

JOHN L. KELLY.